July 4, 1944.　　　E. KRASKI ET AL　　　2,353,043
WELDING GOGGLES
Filed April 21, 1943　　2 Sheets-Sheet 1
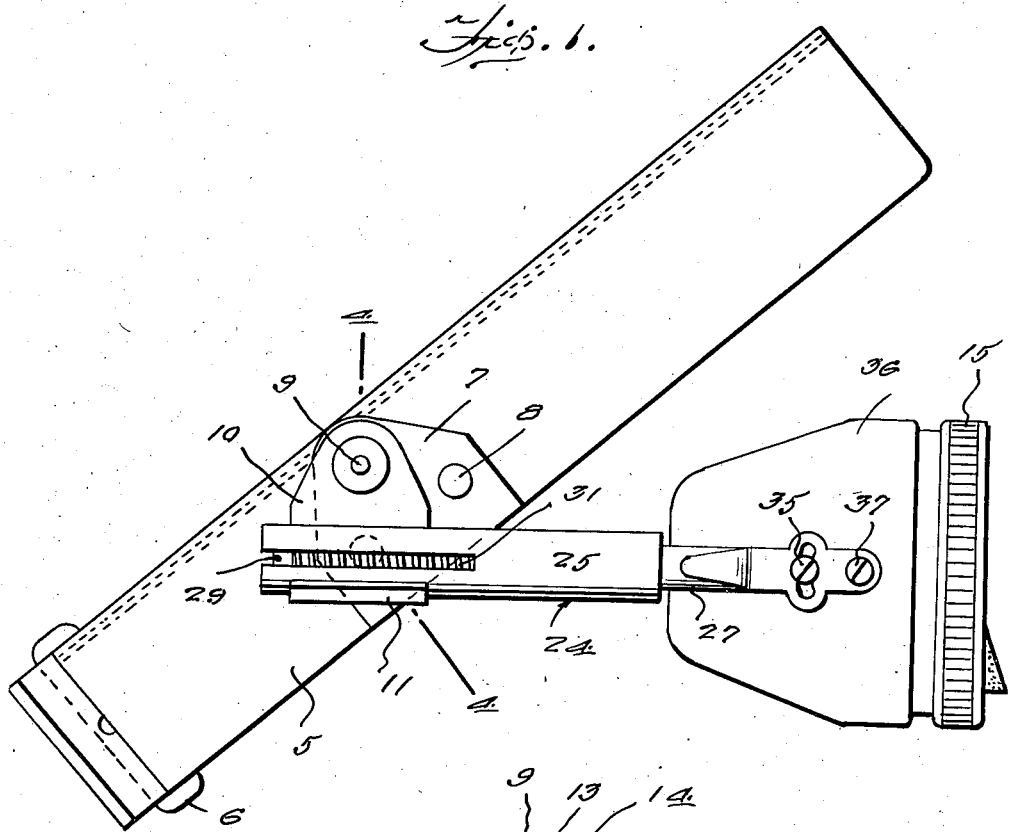
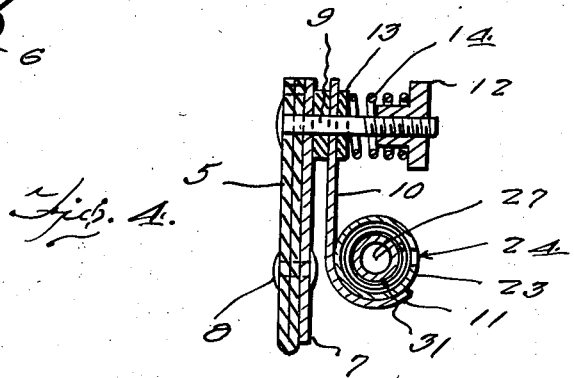
Inventor
Edmund Kraski
Chester Lutowsky July 4, 1944.  E. KRASKI ET AL  2,353,043
WELDING GOGGLES
Filed April 21, 1943  2 Sheets-Sheet 2
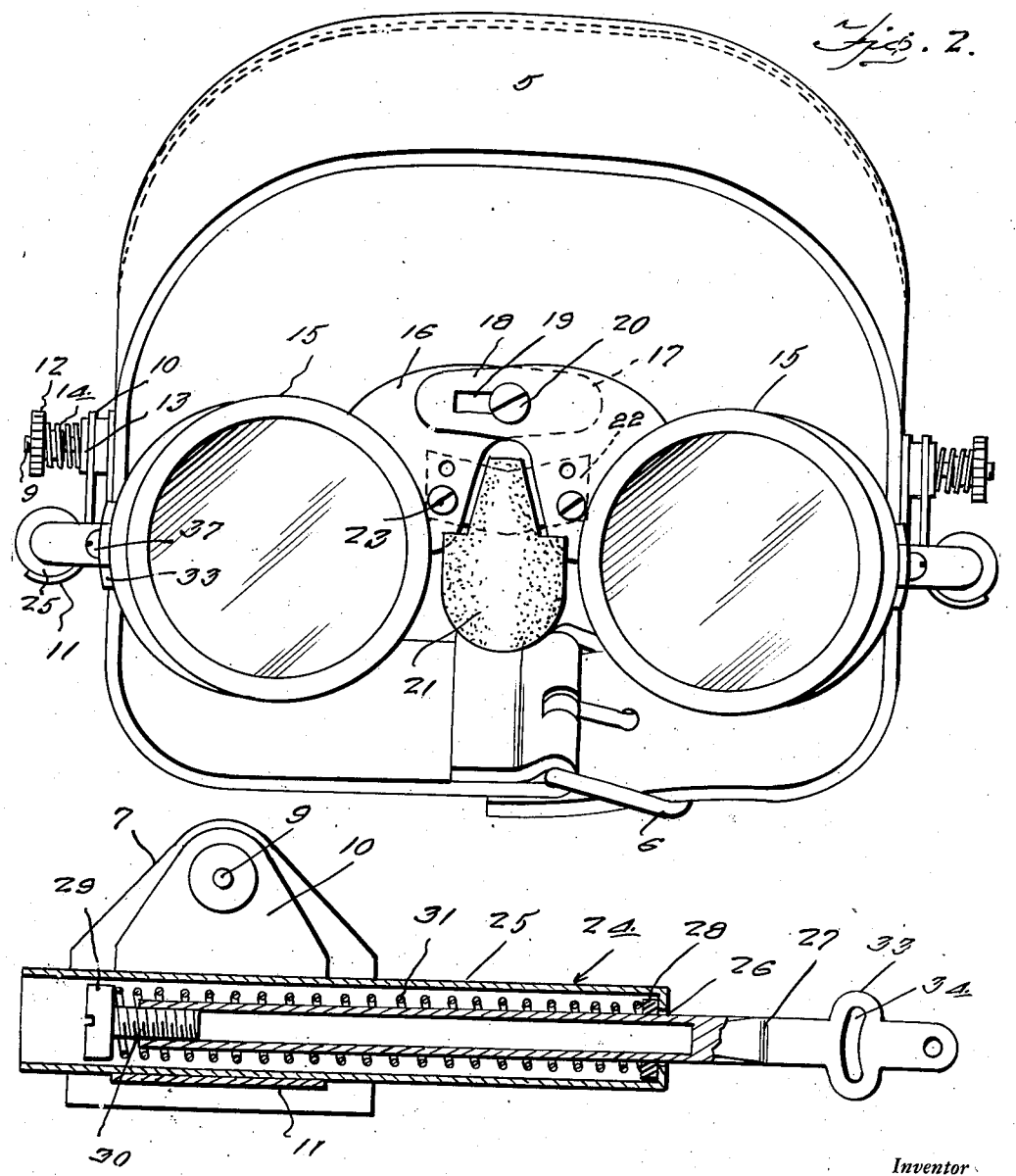

Patented July 4, 1944

2,353,043

UNITED STATES PATENT OFFICE 2,353,043

WELDING GOGGLES

Edmund Kraski, Dearborn, and Chester Lutowsky, Detroit, Mich.

Application April 21, 1943, Serial No. 483,942

2 Claims. (Cl. 2—8)

This invention relates to new and useful improvements in goggles for use in conjunction with various kinds of welding to efficiently protect the eyes of the welder.

The principal object of the present invention is to provide goggles for welders which will firmly contact the face of the welder in such a manner as to totally protect the welder's eyes against the admission of glance rays, and further, to prevent any tendency of the goggles to slip while the welder is working.

Another important object of the invention is to provide welders' goggles with adjustable nose pieces which can be readily adjusted to fit the nose of any welder.

Other objects and advantages of the invention will become apparent to the reader of the following description.

In the drawings:

Figure 1 represents a side elevational view.

Figure 2 is a front elevation.

Figure 3 is a longitudinal sectional view through the temple structure.

Figure 4 is a cross sectional view taken substantially on line 4—4 of Figure 1.

Referring to the drawings wherein like numerals designate like parts, it can be seen that numeral 5 denotes a head encircling band, the same having end portions which can be connected by a buckle or the like 6. As can be seen in Figure 4, and also in Figure 2, the belt or strap 5 is reinforced at a pair of diametrically opposite side portions with a metal plate 7 which can be riveted, as at 8, to the strap.

A bolt 9 extends through the strap 5 at this point and also through the plate 7, the same passing through the vertical wall 10 of a saddle 11. A nut 12 is provided on the bolt 9 and interposed between the nut 12 and a washer 13, the latter bearing against the wall 10, is a coiled compression spring 14. Obviously, by loosening the nut 12, the saddle 11 or the strap 5 can be adjusted to the desired extent.

The goggles proper comprise a pair of lens boxes 15, 15, the same having inwardly disposed plate portions 16 each having an upper reduced extension, these extensions being denoted by reference characters 17, 18. The extensions 17, 18 are disposed in overlapping relation, with the extension 18 having a slot 19 therein through which a screw 20 is disposed, this screw being threadedly disposed into a threaded recess in the reduced extension 17. Obviously, this slot 19 and the screw 20 permits adjustment between the plates pieces 16, 16.

Numeral 21 denotes a nose piece which is secured to a bridge member 22, and the bridge member 22 in turn bridges the insides of the plate members 16, 16 at the lower portions thereof, as shown in Figure 2, and is held in place by set screws 23. Bridge members of different lengths may be selectively used to correspond to the relative adjustment of plates 16, or the latter may be slotted where the screws 23 pass through them.

The temples for the goggles are each denoted by numeral 24. Each temple structure comprises an elongated barrel 25 closed at one end excepting for a small opening 26 through which a hollow rod 27 is slidably disposed. Inside of the barrel 25 at the closed end thereof is a washer 28 between which and the head 29 of a screw 30 at the innermost end of the rod 27 is interposed a coiled compression spring 31. The screw 30 is feedable in the corresponding end of the hollow rod 27 so as to regulate the tension of the spring 31.

The forward end of the rod 27 has a head structure 33 formed with an arcuate vertical slot 34 therein to receive a set screw 35 driven into the side wall of the corresponding eye shield 36, which is of course in connection with one of the lens boxes 15. The forward end of the rod 27 is furthermore pivotally connected, as at 37, to the shield 36.

As is apparent, the rear end portion of the barrel 25 is welded or otherwise secured to the saddle 11.

It can be seen from the foregoing that the goggles are readily adjustable to fit the face of practically any workman, and further, that the structure can be adjusted easily and conveniently with but a minimum expenditure of time on the part of the workman.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. Welding goggles comprising a head encircling band, temples pivoted at their rear ends to opposite sides of said band, friction means for maintaining the band and temples in various positions of relative vertical tilting adjustment about the tempel pivots, each of said temples embodying a spring tension device, including a barrel and a spring-pressed rod slidably telescoped in the barrel, lens boxes having rearwardly extending eye shields at the outer sides thereof, the foreward ends of said temples being adjustably pivoted to said eye shields to permit vertical tilting adjustment of the lens boxes, and means connecting the lens boxes.

2. Welding goggles comprising a head encircling band, a pair of temples, each temple embodying a spring tension device, including a barrel and a spring pressed rod slidably telescoped in the barrel, depending saddles pivoted to opposite sides of said band and having the rear ends of the temple barrels secured therein, friction means at the saddle pivots for maintaining the band and temples in various positions of relative vertical tilting adjustment about the saddle pivots, lens boxes having rearwardly extending eye shields at the outer sides thereof, the forward ends of the temple rods being adjustably pivoted to said eye shields to permit vertical tilting adjustment of the lens boxes, and means connecting the lens boxes.

EDMUND KRASKI.
CHESTER LUTOWSKY.